United States Patent
Liu et al.

(10) Patent No.: US 10,700,601 B2
(45) Date of Patent: Jun. 30, 2020

(54) POWER CONVERSION DEVICE AND POWER CONVERSION SYSTEM WITH ADJUSTABLE AND CONTINUOUS OUTPUT VOLTAGE

(71) Applicant: Delta Electronics (Shanghai) Co., Ltd., Shanghai (CN)

(72) Inventors: Xinwei Liu, Shanghai (CN); Xingkuan Guo, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/842,839

(22) Filed: Dec. 14, 2017

(65) Prior Publication Data
US 2018/0175724 A1 Jun. 21, 2018

(30) Foreign Application Priority Data
Dec. 16, 2016 (CN) .......................... 2016 1 1170577

(51) Int. Cl.
*H02M 3/04* (2006.01)
*H02M 3/158* (2006.01)
*H02M 1/00* (2006.01)

(52) U.S. Cl.
CPC ............. *H02M 3/04* (2013.01); *H02M 3/158* (2013.01); *H02M 3/1582* (2013.01); *H02M 2001/0077* (2013.01)

(58) Field of Classification Search
CPC ..................................................... H02M 3/04
See application file for complete search history.

(56) References Cited

U.S. PATENT DOCUMENTS

| | | | |
|---|---|---|---|
| 7,151,362 B1 | 12/2006 | Siri | |
| 8,227,939 B2 | 7/2012 | Jacobson et al. | |
| 8,300,438 B1 | 10/2012 | Herbert | |
| 2005/0286277 A1 | 12/2005 | Krein | |
| 2006/0273770 A1* | 12/2006 | Siri ....................... | H02M 3/157 323/272 |
| 2013/0062958 A1* | 3/2013 | Erickson, Jr. ....... | H02M 3/1582 307/82 |
| 2013/0163302 A1 | 6/2013 | Li et al. | |
| 2013/0194706 A1* | 8/2013 | Har-Shai ............. | H02H 1/0015 361/42 |
| 2014/0211513 A1 | 7/2014 | Sakita | |

(Continued)

FOREIGN PATENT DOCUMENTS

| | | |
|---|---|---|
| CN | 102904454 A | 1/2013 |
| CN | 202750016 U | 2/2013 |

(Continued)

*Primary Examiner* — Jue Zhang
*Assistant Examiner* — Trinh Q Dang
(74) *Attorney, Agent, or Firm* — CKC & Partners Co., LLC

(57) ABSTRACT

The disclosure discloses a power conversion device and a power conversion system. The power conversion device comprises a plurality of conversion branches, each comprising an input terminal and an output terminal. The input terminals of the plurality of conversion branches are connected in parallel, and the output terminals of the plurality of conversion branches are connected in series. An output voltage of the power conversion device is a sum of voltages at the output terminals of the plurality of conversion branches.

16 Claims, 5 Drawing Sheets

(56) References Cited

U.S. PATENT DOCUMENTS

| | | | |
|---|---|---|---|
| 2015/0001932 A1* | 1/2015 | Inoue | G05F 1/67 |
| | | | 307/24 |
| 2015/0303815 A1 | 10/2015 | Chen et al. | |
| 2016/0261205 A1* | 9/2016 | Kolar | H02M 5/458 |
| 2017/0011830 A1* | 1/2017 | Lu | H01F 3/10 |
| 2017/0012540 A1* | 1/2017 | Jeong | H02M 1/32 |

FOREIGN PATENT DOCUMENTS

| | | |
|---|---|---|
| CN | 103701331 A | 4/2014 |
| CN | 105811775 A | 7/2016 |
| JP | H05276736 A | 10/1993 |
| JP | H05276736 A1 | 10/1993 |
| JP | 2009290919 A | 12/2009 |
| JP | 2010041918 A | 2/2010 |

\* cited by examiner

POWER CONVERSION DEVICE AND POWER CONVERSION SYSTEM WITH ADJUSTABLE AND CONTINUOUS OUTPUT VOLTAGE

CROSS-REFERENCE TO RELATED APPLICATIONS

This non-provisional application claims priority under 35 U.S.C. § 119(a) on Patent Application No. 201611170577.2 filed in P.R. China on Dec. 16, 2016, the entire contents of which are hereby incorporated by reference.

Some references, if any, which may include patents, patent applications and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited and/or discussed in this specification are incorporated herein by reference in their entireties and to the same extent as if each reference was individually incorporated by reference.

TECHNICAL FIELD

The present invention relates to a power conversion device, in particular to a power conversion device which is continuously adjustable and has a wide range of output voltage, and a power conversion system.

BACKGROUND ART

Generally speaking, the converters may be divided into two types depending on their modulation methods. One is a pulse width modulation (PWM) converter, and the other is a pulse frequency modulation (PFM) converter. The two different types of converters have their respective advantage and disadvantage. The PWM converter, such as a phase shift full bridge (PSFB) converter, may output a voltage in a wide range. However, the PWM converter can't realize soft switching conditions for all devices, which makes it impossible to obtain high frequency and results in a relatively large size. The PFM converter, such as a series resonant (LLC) converter, may realize soft switching conditions for all devices, that making it possible to obtain high efficiency and high frequency and to minimize the size of the converter. However, the PFM converter could only output a voltage in a narrow range. This is because other characteristics, such as high efficiency, of the PFM converter would be lost if the PFM converter outputs a voltage in wide range.

In an application of an electric vehicle charging station, a charging device is required to be an isolated converter. The isolated converter generally demands an output voltage in a wide range of 200-1000 V, and a power in a range of 50-300 kW. It has become a major challenge to increase the efficiency and minimize the size of the charging device.

An object of the present disclosure is to provide a novel combining and controlling method of converters for achieving high efficiency and optimized size while outputting a voltage in a super wide range.

SUMMARY

The present disclosure provides a power conversion device comprising a plurality of conversion branches, each comprising an input terminal and an output terminal, wherein the input terminals of the plurality of conversion branches are connected in parallel, and the output terminals of the plurality of conversion branches are connected in series, wherein an output voltage of the power conversion device is a sum of voltages at the output terminals of the plurality of conversion branches, and wherein the plurality of conversion branches are controlled to enter an operating state or a non-operating state, so as to make the output voltage of the power conversion device adjustable and continuous.

The present disclosure further provides a power conversion system comprising a plurality of the power conversion devices as described in the preceding item, wherein the input terminals of the plurality of the power conversion devices are connected in parallel, and the output terminals of the plurality of the power conversion devices are connected in series, and wherein an output voltage of the power converter system is a sum of the output voltages of the plurality of the power conversion devices.

Compared with a conventional converter, the present disclosure has the following beneficial technical effects.

The power conversion device is provided with a plurality of conversion branches in design, each of the conversion branches comprises first-stage isolated converters, or the first-stage isolated converters are connected in series with the second-stage converters to provide the power conversion device with a wide range of continuous and adjustable output voltage, and each of the conversion branches is controlled to be in operating state or non-operating state, such that an output voltage of the power conversion device is different combinations of voltages at the output terminals of the conversion branches, which realizes the characteristic of continuous and wide range of output voltage, and realize the most optimal design of the conversion branches.

DETAILED DESCRIPTION OF THE PREFERRED EMBODIMENT

The present disclosure will be further described in combination with examples and accompanied drawings to provide a better understanding of the state of the present disclosure, but the examples herein are not used to limit the scope of the present disclosure, and the description of structure operation is not used to limit the order of execution. Instead, any device obtained from a structure recombined by components and having equivalent functions falls within the scope of the present disclosure. In addition, according to the industry standards and common practices, the drawings are for illustrative purposes only and are not plotted in accordance with the original dimensions. In practice, the dimensions of various features may be arbitrarily increased or decreased for illustration. In the following description, identical elements will be designated by identical symbols for convenience of understanding.

Unless otherwise specified, the terms used throughout this specification and patent applications generally have ordinary meanings as used in the art, the content disclosed herein and the specific contents. The terminology used to describe the present disclosure will be discussed below or elsewhere in this specification to provide additional guidance to those skilled in the art regarding the present disclosure.

In addition, as used herein, the terms "comprises," "comprising," "have," "having" and the like are open terms and intended to be "inclusive but not limited". Further, the terms "and/or" used herein comprise any and all combinations of one or more associated enumerations.

As used herein, an element referred to as "connected" or "coupled" may refer to "electrically connected" or "electrically coupled". The "connected" or "coupled" is also used to indicate cooperation of two or more elements or interaction with each other. In addition, although the terms "first," "second" and the like are used herein to describe different elements, the terms are merely used to distinguish elements or operations described by identical technical terms. Unless the context clearly dictates, the terms are not intended to be specific or suggestive or sequential or to define the present disclosure.

The detailed contents and technical description of the present disclosure are hereby described by way of a preferred example but should not be interpreted to limit the practice of the present disclosure.

Figure 1:
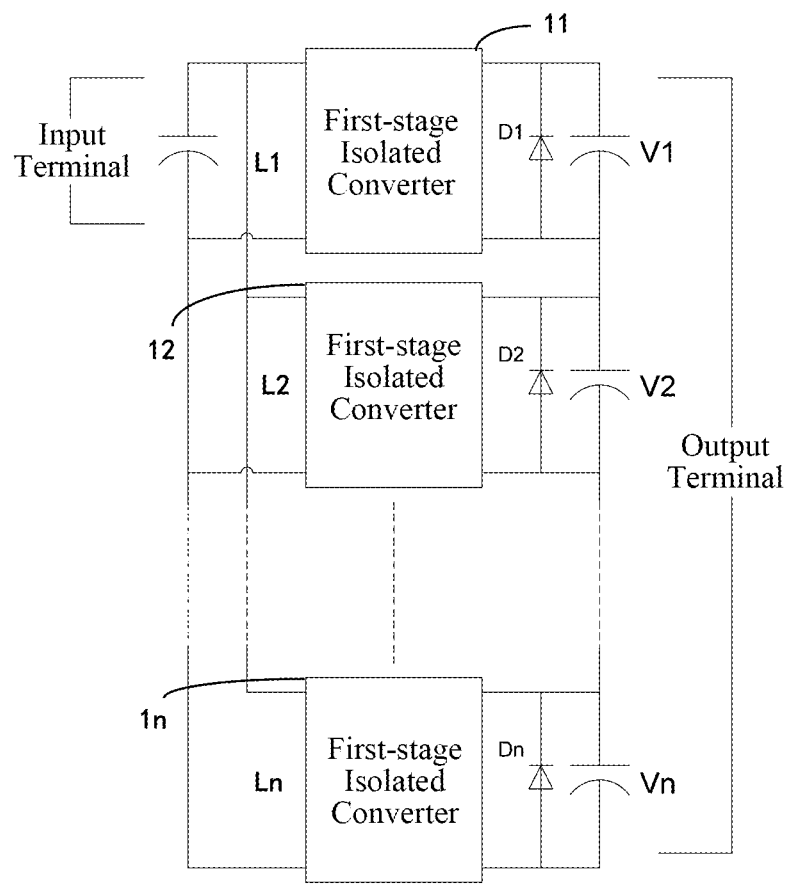
FIG. 1 is a schematic diagram for an embodiment of a power conversion device according to the present disclosure.

FIG. 1 is a schematic diagram showing a power conversion device 1 according to an embodiment of the present disclosure. In this embodiment, as shown in FIG. 1, the power conversion device 1 comprises a plurality of conversion branches L1 to Ln, wherein a number of the conversion branches is n, here n is a natural number greater than 1, each including an input terminal and an output terminal. The input terminals of the conversion branches L1 to Ln are connected in parallel to form an input terminal of the power converter device for receiving an input voltage. The output terminals of the conversion branches L1 to Ln are connected in series to form an output terminal of the power converter device for generating an output voltage of the power converter device. The output voltage of the power conversion device is a sum of voltages at the output terminals of the conversion branches L1 to Ln. When the ith conversion branch of conversion branches L1 ... Ln enters an operating state, the voltage at the output terminal of the ith conversion branch is Vi. It should be noted that the output voltage Vi of the ith conversion branch is continuous and adjustable within a preset voltage range according to a control signal; and when the ith conversion branch enters a non-operating state, the voltage at the output terminal of the ith conversion branch is 0V. Here, $1 \leq i \leq n$. As an example, when both the conversion branches L1 and L2 enter the operating state, the voltage at the output terminal of the conversion branch L1 is V1, and the voltage at the output terminal of the conversion branch L2 is V2. As a result, the output voltage of the power conversion device 1 is V1+V2. When the conversion branch L1 enters the operating state while the conversion branch L2 enters the non-operating state, the voltage at the output terminal of the conversion branch L1 is V1, and the voltage at the conversion branch L2 is 0V. As a result, the output voltage of the power conversion device 1 is V1+0=V1. As another example, when all the conversion branches L1 to Ln are in the operating state, the output voltage of the power conversion device 1 is V1+V2+ ... +Vn. Further, when only the conversion branches L1 and L2 enter the operating state while other conversion branches are in the non-operating state, the output voltage of the power conversion device 1 is V1+V2. Further, when only the conversion branches L1, L2, and L5 are in the operating state while other conversion branches are in the non-operating state, the output voltage of the power conversion device 1 is V1+V2+V5. In this way, by controlling one conversion branch or the plurality of conversion branches to enter various possible combinations of the operating state or the non-operating state, the power conversion device 1 may generate an output voltage which is continuous and adjustable in a wide range. In this embodiment, each conversion branch may enter the operating state or the non-operating state according to a control signal received from the controller (not shown in FIG. 1). According to a user's requirement with respect to the output voltage of the power conversion device 1, the controller may output control signals to the conversion branches L1, L2, ..., Ln, for controlling them to enter the operating state or the non-operating state. For example, when the output voltage of the power conversion device 1 required by the user is V2+V3, the controller may output control signals to the conversion branches L1, L2, ..., Ln so as to cause the conversion branch L2 to enter the operating state for outputting a voltage V2 at its output terminal, to cause the conversion branch L3 to enter the operating state for outputting a voltage V3 at its output terminal, and to cause other conversion branches to enter the non-operating state for outputting a voltage 0V at their respective output terminals.

The power conversion device 1 may further comprise a plurality of bypass elements D1 to Dn. That is, each conversion branch may comprise a bypass element, wherein the bypass element is connected in parallel at the output terminal of the conversion branch. For example, the bypass element D1 is connected in parallel at the output terminal of the conversion branch L1, and the bypass element Dn is connected in parallel at the output terminal of the conversion branch Ln. When a conversion branch enters the non-operating state, an output current of the power conversion device 1 flows through the bypass element in the conversion branch, to provide a voltage 0V at the output terminal of the conversion branch. For example, when the conversion branch L1 enters the non-operating state, the output current of the power conversion device 1 flows through the bypass element D1.

It is noted that the voltage at the output terminal of each conversion branch may be identical or different in this embodiment.

Each conversion branch may further comprise a first-stage isolated converter. An input terminal of the first-stage isolated converter is connected to an input terminal of its respective conversion branch, and an output terminal of the first-stage isolated converter is connected to an output terminal of its respective conversion branch. For example, the input terminal of the first-stage isolated converter 11 is connected to the input terminal of the conversion branch L1, and the output terminal of the first-stage isolated converter 11 is connected to the output terminal of the conversion branch L1. The input terminal of the first-stage converter 1*n* is connected to the input terminal of the conversion branch Ln, and the output terminal of the first-stage isolated converter 1*n* is connected to the output terminal of the conversion branch Ln. In this embodiment, the controller (not shown in FIG. 1) outputs a control signal to the first-stage isolated converter in a conversion branch, to control it to enter the operating state or the non-operating state. For example, when the output voltage of the power conversion device 1 required by the user is V2+V3, the controller may output control signals to the first-stage isolated converters so as to cause the first-stage isolated converter 12 in the conversion branch L2 to enter the operating state for outputting a voltage V2 at the output terminal of the conversion branch L2, to cause the first-stage isolated converters 13 in the conversion branch L3 to enter the operating state for outputting a voltage V3 at the output terminal of the conversion branch L3, and to cause the first-stage isolated converters in other conversion branches to enter the non-operating state for outputting a voltage 0V at their respective output terminals.

In this embodiment, each conversion branch may further comprise a bypass element which is connected in parallel at the output terminal of the first-stage isolated converter. For example, as shown in FIG. 1, the bypass elements D1 are connected in parallel at the output terminal of the first-stage isolated converter 11, the bypass elements D2 are connected in parallel at the output terminal of the first-stage isolated converter 12, and the bypass elements Dn are connected in parallel at the output terminal of the first-stage isolated converter 1n. When a first-stage isolated converter in a conversion branch enters the non-operating state, the output current of the power conversion device 1 flows through the bypass element included in the conversion branch. The output current of the power conversion device 1 flows through the bypass element D1 when the first-stage isolated converter 11 enters the non-operating state. In this embodiment, the bypass elements D1 to Dn are diodes, each diode being connected in parallel at the output terminal of the first-stage isolated converter respectively. However, the present disclosure is not limited thereto. In other embodiments, the diodes may be omitted. For example, in a conversion branch in which the diode is omitted, the first-stage isolated converter may contain a bypass element through which the output current may flow. In such a case, when the first-stage isolated converter enters the non-operating state, the output current of the power conversion device 1 may flow through the bypassing element (e.g., a diode) within the first-stage isolated converter.

In this embodiment, the first-stage isolated converter may be a LLC series resonant converter. When the output voltage of the power conversion device 1 required by the user is a DC voltage of 200V to 900V, the conventional single LLC series resonant converter could not support such a wide range of output voltage, or otherwise could only supports such a with range at the expense of efficiency, output ripple or other performances. According to the configuration shown in FIG. 1, in a case where a number of the plurality of conversion branches is 3, such as conversion branches L1, L2 and L3, the input terminals of the conversion branches L1, L2 and L3 are connected in parallel, the output terminals of the conversion branches L1, L2 and L3 are connected in series, and each conversion branch comprises a first-stage isolated converter. Here, the first-stage isolated converter is a LLC series resonant converter. The voltages at the output terminals of the three LLC series resonant converters are V1, V2 and V3, respectively.

The controller may control each LLC series resonant converters (the first-stage isolated converter) to enter the operating state or the non-operating state, such that:

when the conversion branch L1 enters the operating state, the voltage at the output terminal of the conversion branch L1 is V1 in a range of 150V-300V; or when the conversion branch L1 enters the non-operating state, the voltage at the output terminal of the conversion branch L1 is 0V;

when the conversion branch L2 enters the operating state, the voltage at the output terminal of the conversion branch L2 is V2 in a range of 150V-300V; or when the conversion branch L2 enters the non-operating state, the voltage at the output terminal of the conversion branch L2 is 0V; and when the conversion branch L3 enters the operating state, the voltage at the output terminal of the conversion branch L3 is V3 in a range of 150V-300V; or when the conversion branch L3 enters the non-operating state the voltage at the output terminal of the conversion branch L3 is 0V.

In a case where only one conversion branch enters the operating state, for example, in a case where the conversion branch L1 is in the operating state with a voltage V1 at the output terminal of the conversion branch L1, and both the conversion branches L2 and L3 are in the non-operating state with a voltage 0V at the output terminals of the conversion branches L2 and L3, the output voltage of the power conversion device 1 is V1 in a range of 150V-300V.

In a case where two conversion branches enter the operating state, for example, in a case where the conversion branches L1 and L2 are in the operating state with voltages V1 and V2 at respective output terminals of the conversion branches L1 and L2, and the conversion branch L3 is in the non-operating state with a voltage 0V at the output terminal of the conversion branch L3, the output voltage of the power conversion device 1 is V1+V2 in a range of 300V-600V.

In a case where three conversion branches are all in the operating state, for example, in a case where all the conversion branches L1, L2, and L3 are in the operating state with voltages V1, V2 and V3 at respective output terminals of the conversion branches L1, L2 and L3, the output voltage of the power conversion device 1 is V1+V2+V3 in a range of 450V-900V.

As discussed above, by controlling the plurality of conversion branches to enter various possible combinations of the operating state or the non-operating state, the power conversion device 1 may generate an output voltage which is continuous and adjustable in a wide range of 200V-900V. Meanwhile, the voltage at the output terminal of the LLC series resonant converter (the first-stage isolated converter) contained in each conversion branch may only vary in a doubled range, i.e., a range from 150V to 300V.

The controller may also control each LLC series resonant converter (the first-stage isolated converter) to enter the operating state or the non-operating state, such that:

when the conversion branch L1 enters the operating state, the voltage at the output terminal of the conversion branch L1 is V1 in a range of 200V-265V; or when the conversion branch L1 enters the non-operating state, the voltage at the output terminal of the conversion branch L1 is 0V;

when the conversion branch L2 enters the operating state, the voltage at the output terminal of the conversion branch L2 is V2 in a range of 265V-352V; or when the conversion branch L2 enters the non-operating state, the voltage at the output terminal of the conversion branch L2 is 0V; and when the conversion branch L3 enters the operating state, the voltage at the output terminal of the conversion branch L3 is V3 in a range of 352V-467V; or when the conversion branch L3 enters the non-operating state, the voltage at the output terminal of the conversion branch L3 is 0V.

In a case where the conversion branch L1 is in the operating state with a voltage V1 at the output terminal of the conversion branch L1, and both the conversion branches L2 and L3 are in the non-operating state with a voltage 0V at respective output terminals of the conversion branches L2 and L3, the output voltage of the power conversion device 1 is V1 in a range of 200V-265V.

In a case where the conversion branch L2 is in the operating state with a voltage V2 at the output terminal of the conversion branch L2, and both the conversion branches L1 and L3 are in the non-operating state with a voltage 0V at respective output terminals of the conversion branches L1 and L3, the output voltage of the power conversion device 1 is V2 in a range of 265V-352V.

In a case where the conversion branch L3 is in the operating state with a voltage V3 at the output terminal of the conversion branch L3, and both the conversion branch L1 and the conversion branch L2 are in the non-operating state with a voltage 0V at respective output terminals of the conversion branches L1 and L2, the output voltage of the power conversion device 1 is V3 in a range of 352V-467V.

In a case where the conversion branches L1 and L2 are in the operating state with voltages V1 and V2 at respective output terminals of the conversion branches L1 and L2, and the conversion branch L3 is in the non-operating state with a voltage 0V at the output terminal of the conversion branch L3, the output voltage of the power conversion device 1 is in a range of V1+V2 in a range of 465V-617V.

In a case where the conversion branches L2 and L3 are in the operating state with voltages V2 and V3 at respective output terminals of the conversion branches L2 and L3, and the conversion branch L1 is in the non-operating state with a voltage 0V at the output terminal of the conversion branch L1, the output voltage of the power conversion device 1 is V2+V3 in a range of 617V-819V.

In a case where all the conversion branches L1, L2, and L3 are in the operating state with voltages V1, V2 and V3 at respective output terminals of the conversion branches L1, L2 and L3, the output voltage of the power conversion device 1 is V1+V2+V3 in a range of 817V-1084V.

As discussed above, by controlling the plurality of conversion branches to enter various possible combinations of the operating state or the non-operating state, the power conversion device 1 may generate an output voltage which is continuous and adjustable in a wide range of 200V-900V. Meanwhile, the voltage at the output terminal of the LLC series resonant converter (the first-stage isolated converter) contained in each conversion branch may only vary in a range increased by 1.325 times, i.e., a range from 200V to 265V, from 265V to 352V, or from 352V to 467V.

Figure 2:
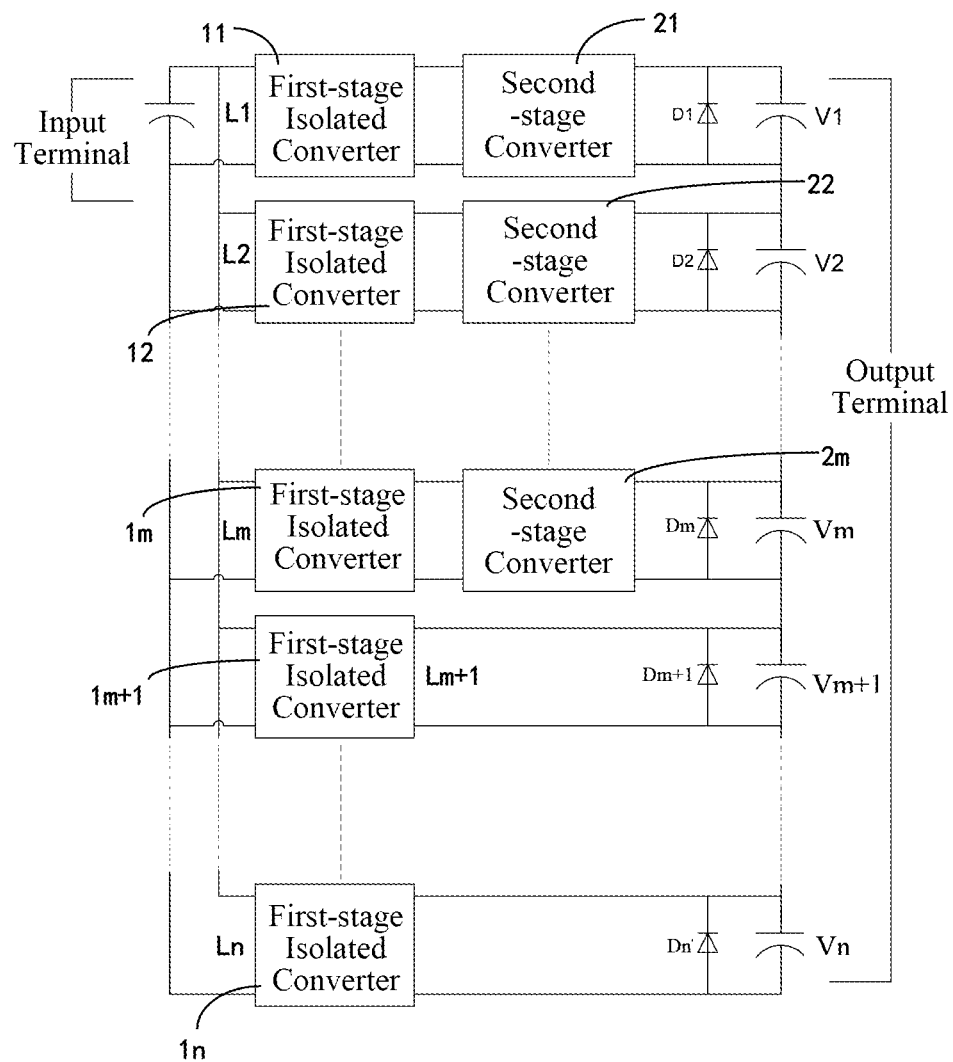
FIG. 2 is a schematic diagram for another embodiment of the power conversion device according to the present disclosure.

FIG. 2 is a schematic diagram showing a power conversion device 2 according to another embodiment of the present disclosure. In this embodiment, part or all of the conversion branches in the power conversion device 2 may further include at least one second-stage converter, a number of the at the least one second-stage converter is m. Each of the plurality of the conversion branches comprises a first-stage isolated converter. An input terminal of the second-stage converter is connected to an output terminal of a corresponding first-stage isolated converter. An input terminal of the first-level isolated converter is connected to an input terminal of a corresponding conversion branch. An output terminal of the second-stage converter is connected to an output terminal of a corresponding conversion branch and an output terminal of the first-stage isolated converter is connected to an output terminal of a corresponding conversion branch which doesn't have the second-stage converter. Here, 1≤m≤n, and both m and n are natural numbers and n is greater than 1. For example, the input terminal of the first-stage isolated converter 11 is connected to the input terminal of the conversion branch L1, the input terminal of the second converter 21 is connected to the output terminal of the first-stage isolated converter 11, and the output terminal of the second-stage converter 21 is connected to the output terminal of the conversion branch L1. The input terminal of the first-stage isolated converter 1m is connected to the input terminal of the conversion branch Lm, the input terminal of the second-stage converter 2m is connected to the output terminal of the first-stage isolated converter 1m, and the output terminal of the second-stage converter 2m is connected to the output terminal of the conversion branch Lm. The input terminal of the first-stage isolated converter 1n is connected to the input terminal of the conversion branch Ln, and the output terminal of the first-stage isolated converter is connected to the output terminal of the conversion branch Ln. In this embodiment, the first-stage isolated converter may be a LLC series resonant converter; while the second-stage converter may be a non-isolated converter or an isolated converter. Here, the non-isolated converter may be a BUCK circuit, a BOOST circuit, a FLYBACK circuit, or the like. Further, the isolated converter may be a LLC series resonant converter, a LC resonant converter, or the like.

The power conversion device 2 may further comprise a plurality of bypass elements D1 to Dn. That is, each conversion branch may comprise a bypass element connected in parallel at the output terminal of the conversion branches. For example, the bypass element D1 is connected in parallel at the output terminal of the conversion branch L1, and the bypass element Dn is connected in parallel at the output terminal of the conversion branch Ln. When a conversion branch enters the non-operating state, the output current of the power conversion device 2 flows through the bypass element in the conversion branch. For example, when the conversion branch L1 enters the non-operating state, the output current of the power conversion device 2 flows through the bypass element D1. In this embodiment, the bypass elements D1 to Dn are diodes. However, the present disclosure is not limited thereto. In other embodiments, the diodes may be omitted. For example, in a conversion branch in which the diode is omitted, the first-stage isolated converter or the second-stage converter may contain a bypass element through which the output current may flow. In such a case, when the first-stage isolated converter or the second-stage converter enters the non-operating state, the output current of the power conversion device 2 may flow through the bypassing element (e.g., a diode) within the first-stage isolated converter or the second-stage converter.

The power conversion device 2 shown in FIG. 2 is provided on a basis of the structure of the power conversion device 1 shown in FIG. 1, wherein the output terminals of part or all of the first-stage isolated converters are connected in series to the second-stage converters. In a similar manner as the embodiment shown in FIG. 1, the power conversion device 2 shown in FIG. 2 may also generate an output voltage which is continuous and adjustable in a wide range. Specifically, the second-stage converter may be configured to provide a circuit topology for outputting a wide range of voltage at the output terminal. In this way, even if the voltage at the output terminal of the first-stage isolated converter is maintained in a narrow range of voltage, the power conversion device 2 is capable of obtaining a wide range of output voltage.

Referring to FIG. 2, by taking four conversion branches L1, L2, L3 and L4 as an example, i.e., by setting one first-stage converters in each conversion branch and one second-stage converter in one conversion branch in FIG. 2, each conversion branch comprises a first-stage isolated converter, and one second-stage converter is provided in first conversion branch L1. The first-stage isolated converter is a LLC series resonant isolated converter. The second-stage converter is a BUCK circuit which may output a wide range of voltage. The voltages at the output terminals of the conversion branches L1, L2, L3 and L4 are V1, V2, V3 and V4, respectively. Similarly, the output voltage of the power conversion device 2 is in a range of 200V-900V.

The controller may control the LLC series resonant converter (the first-stage isolated converter) and the BUCK circuit (the second-stage converter) to enter the operating state or the non-operating state, so that:

when the conversion branch L1 enters the operating state, the voltage at the output terminal of the conversion branch L1 is V1 in a range of 0V-225V with a constant voltage of 225V at the output terminal of the LLC series resonant isolated converter 11 and a voltage ranging from 0 to 225V at the output terminal of the BUCK circuit 21; or when the conversion branch L1 enters the non-operating state, the voltage at the output terminal of the conversion branch L1 is 0V;

when the conversion branch L2 enters the operating state, the voltage at the output terminal of the conversion branch L2 is V2=225V; or when the conversion branch L2 enters the non-operating state, the voltage at the output terminal of the conversion branch L2 is 0V;

when the conversion branch L3 enters the operating state, the voltage at the output terminal of the conversion branch L3 is V3=225V; or when the conversion branch L3 enters the non-operating state, the voltage at the output terminal of the conversion branch L3 is 0V; and when the conversion branch L4 enters the operating state, the voltage at the output terminal of the conversion branch L4 is V4=225V; or when the conversion branch L4 enters the non-operating state, the voltage at the output terminal of the conversion branch L4 is 0V.

In a case where the conversion branch L1 is in the operating state with a voltage V1 at the output terminal of the conversion branch L1, and the conversion branches L2, L3 and L4 are in the non-operating state with a voltage 0V at respective output terminals of the conversion branches L2, L3, and L4, the output voltage of the power conversion device 2 is V1 in a range of 0V-225V.

In a case where the conversion branches L1 and L2 are in the operating state with voltages V1 and V2 at respective output terminals of the conversion branches L1 and L2, and the conversion branches L3 and L4 are in the non-operating state with a voltage 0V at respective output terminals of the conversion branches L3 and L4, the output voltage of the power conversion device 2 is V1+V2 in a range of 225V-450V.

In a case where the conversion branches L1, L2, and L3 are in the operating state with voltages V1, V2 and V3 at respective output terminals of the conversion branches L1, L2 and L3, and the conversion branch L4 is in the non-operating state with a voltage 0V at the output terminal of the conversion branch L4, the output voltage of the power conversion device 2 is V1+V2+V3 in a range of 450V-675V.

In a case where the conversion branches L1, L2, L3, and L4 are in the operating state with voltages V1, V2, V3 and V4 at respective output terminals of the conversion branches L1, L2, L3 and L4, the output voltage of the power conversion device 2 is V1+V2+V3+V4 in a range of 675V-900V.

As discussed above, by controlling the plurality of conversion branches to enter various possible combinations of the operating state or the non-operating state, the power conversion device 2 may generate an output voltage which is continuous and adjustable in a wide range of 200V-900V. Moreover, since the voltage at the output terminal of the LLC series resonant converter (the first-stage isolated converter) may be set as a constant voltage, the design of the power conversion device may be optimized.

Figure 3:
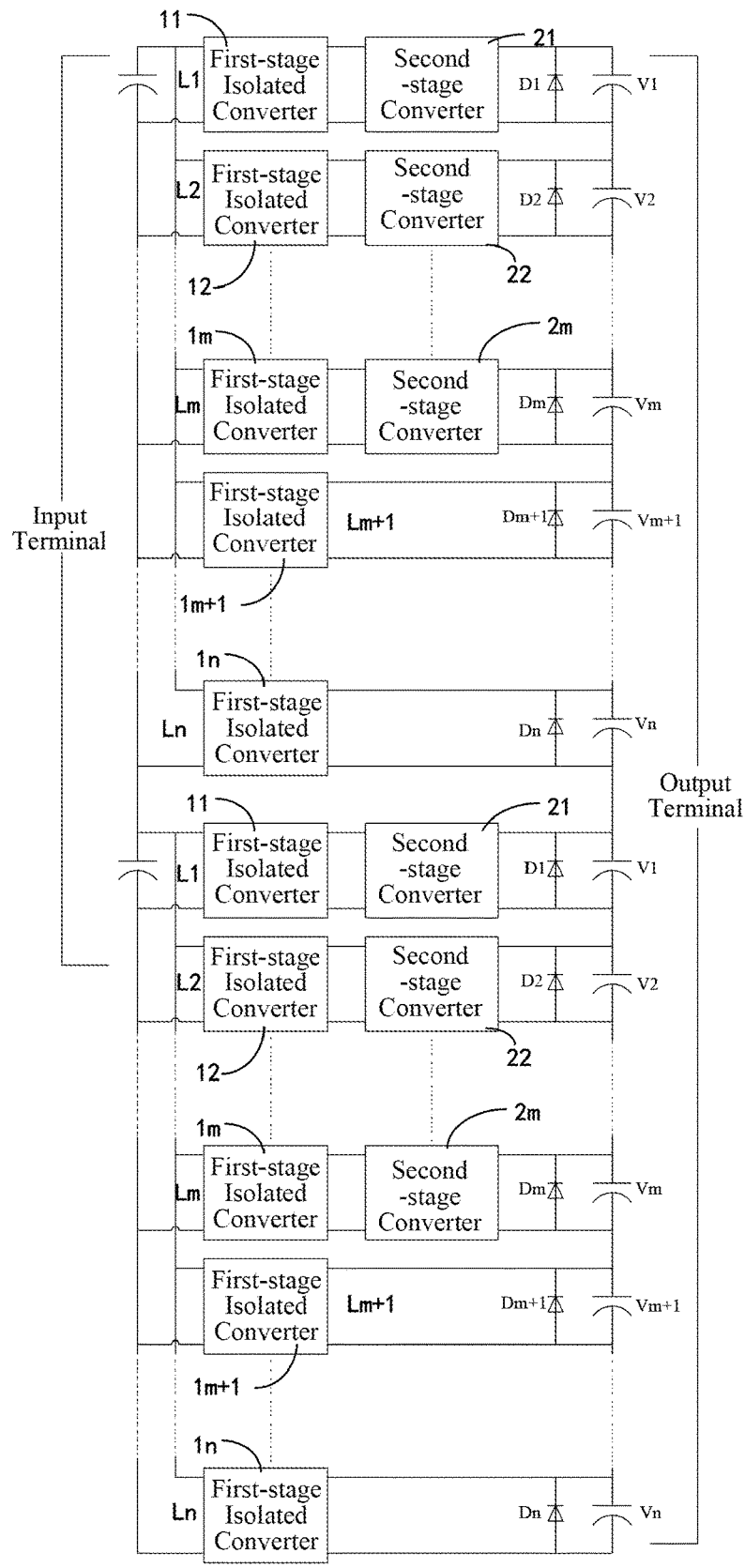
FIG. 3 is a schematic diagram of a power converter system according to the present disclosure.

FIG. 3 is a schematic diagram showing a power conversion system 3 according to an embodiment of the present disclosure. As shown in FIG. 3, the power conversion system 3 comprises a plurality of the power conversion devices illustrated in FIG. 1 and/or FIG. 2. The input terminals of the plurality of power conversion devices are connected in parallel, while the output terminals of the plurality of power conversion devices are connected in series. The output voltage of the power conversion system 3 is a sum of the output voltages of the plurality of power conversion devices 1 and 2.

Figure 4:
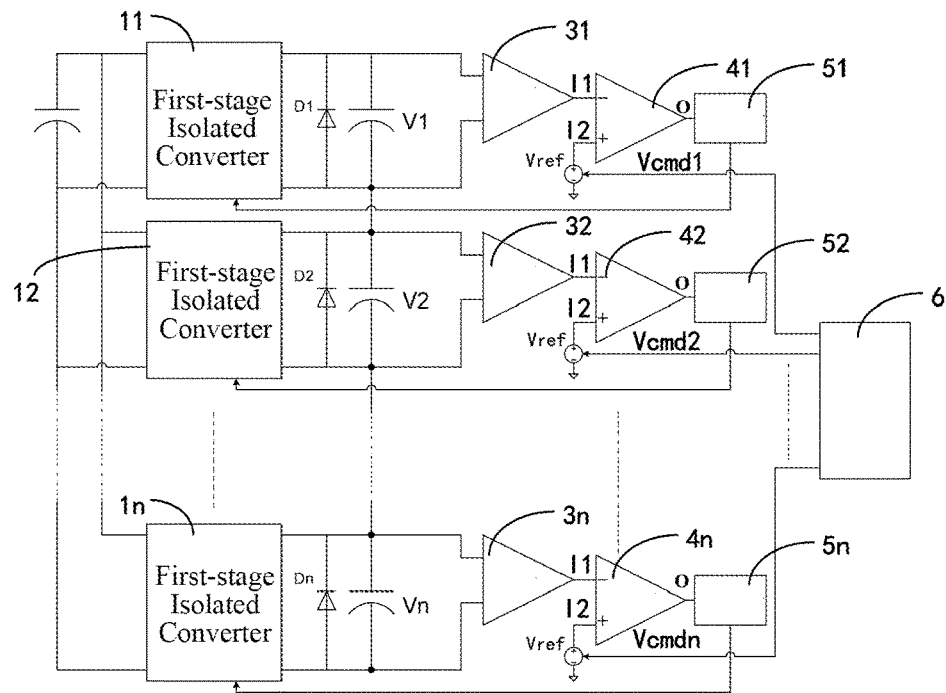
FIG. 4 is a schematic diagram for a control mode according to an embodiment of the power conversion device in FIG. 1.

Now refer to FIGS. 1 and 4. FIG. 4 is a schematic diagram showing an example of a control method for the power conversion device 1 in FIG. 1. As shown in FIGS. 1 and 4, the output terminals of the plurality of conversion branches L1 to Ln are respectively and sequentially coupled to a plurality of voltage sampling circuits 31 to 3n, a plurality of voltage control loop circuits 41 to 4n, and a plurality of branch controllers 51 to 5n. The voltage control loop circuits 41 to 4n are also coupled to a system controller 6. The output terminals of the branch controllers 51 to 5n are correspondingly coupled to conversion branches L1 to Ln. Here, n is a natural number greater than 1. The voltage sampling circuit 31 to 3n samples the voltage from the output terminals of the plurality of conversion branches L1 to Ln, respectively, and generates voltage sampling signals. The system controller 6 sends voltage command signals Vcmd1 to Vcmdn to the voltage control loop circuits 41 to 4n, respectively. The voltage control loop circuits 41 to 4n receive the voltage sampling signals at a first input terminal I1, and receive the voltage command signals at a second input terminal I2. The voltage control loop circuits 41 to 4n perform a closed-loop control on the voltage sampling signals and the voltage command signals so as to output voltage loop control signals at an output terminal O. The branch controllers 51 to 5n receive the voltage loop control signals, respectively, and convert them into control signals to be outputted to the first-stage isolated converters 11-1n, respectively. Specifically, the control signals are transmitted to switching elements in the first-stage isolated converters 11 to 1n, respectively. By switching on and off the switching elements according to the control signals, the first-stage isolated converters 11 to 1n may be enabled to enter the operating state or the non-operating state.

Figure 5:
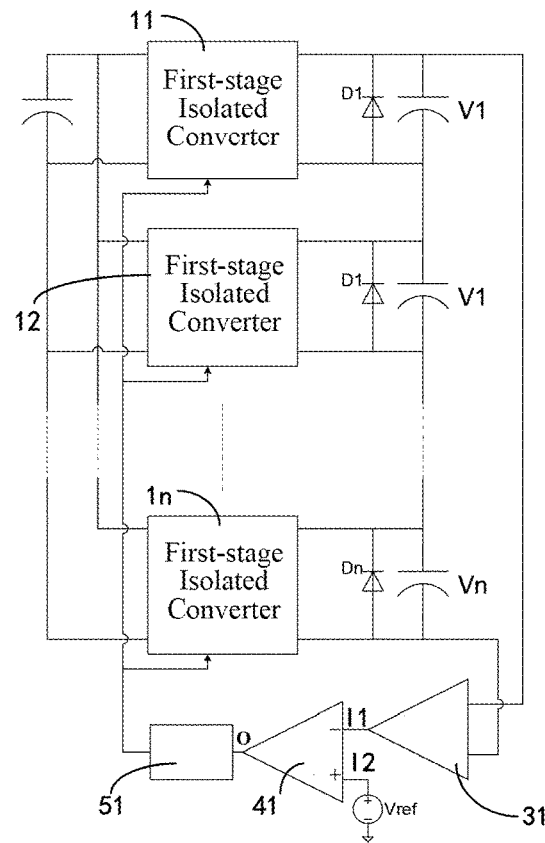
FIG. 5 is a schematic diagram for a control mode according to another embodiment of the power conversion device in FIG. 1.

Now refer to FIGS. 1 and 5. FIG. 5 is a schematic diagram showing another example of a control method for the power conversion device 1 in FIG. 1. Since principle of the control method shown in FIG. 5 is similar to that in FIG. 4, the redundant description thereof will be omitted. The following description will only focus on the difference therebetween. As shown in FIGS. 1 and 5, the output terminal of the power conversion device 1 is sequentially coupled to a voltage sampling circuit 31, a voltage control loop circuit 41 and a branch controller 51. The output terminal of the branch controller 51 is coupled to the plurality of conversion branches L1 to Ln. The voltage sampling circuit 31 samples the output voltage generated by the power conversion device 1 and generates a voltage sampling signal. The voltage control loop circuit 41 receives the voltage sampling signal at a first input terminal I1, and receives a voltage command signal Vref, which is sent from a system controller (not shown), at a second input terminal I2. The voltage control loop circuit 41 performs a closed-loop control on the voltage sampling signal and the voltage command signal Vref so as to output a voltage loop control signal at an output terminal O. The branch controller 51 receives the voltage loop control signal and converts it into control signals to be sent to the first-stage isolated converters 11 to 1n in the conversion branches L1 to Ln, respectively. Specifically, the control signals are transmitted to switching elements in the first-stage isolated converter 11 to 1n, respectively. By switching on and off the switching element according to the control signals, the first-stage isolated converters 11 to 1n may be enabled to enter the operating state or the non-operating state.

Figure 6:
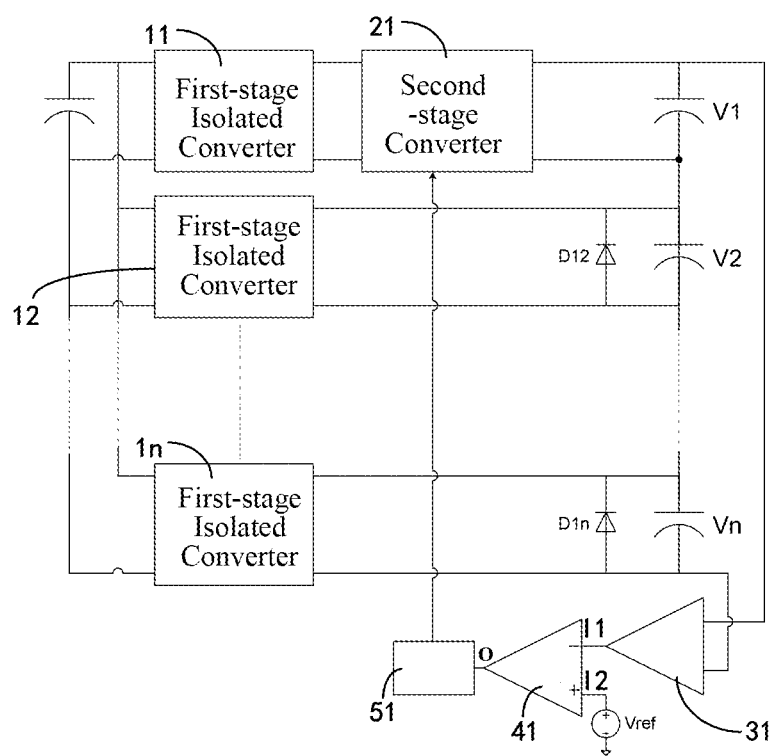
FIG. 6 is a schematic diagram for a control mode of the power conversion device in FIG. 2.

Now refer to FIGS. 2 and 6. FIG. 6 is a schematic diagram showing an example of a control method for the power conversion device 2 in FIG. 2. Since the control method shown in FIG. 6 may control the first-stage isolated converters in opened-loop control manner, or control it in a manner similar to FIG. 4 or 5, the redundant description thereof will be omitted. The following description will only focus on the difference therebetween. In an example shown in FIG. 6, in which the number of the first-stage isolated converters is n, and the number of the second-stage converter is 1, the output terminals of the power conversion device 2 are respectively and sequentially coupled to a voltage sampling circuit 31, a voltage control loop circuit 41, and a branch controller 51. The output terminal of the branch controller 51 is coupled to a second-stage converter 21. The voltage sampling circuit 31 samples the voltage at the output terminal generated by the power conversion device 2, and generates a voltage sampling signal. The voltage control loop circuit 41 receives the voltage sampling signal at a first input terminal I1, and receives a voltage command signal Vref, which is sent from a system controller (not shown), at a second input terminal I2. The voltage control loop circuit 41 performs a closed-loop control on the voltage sampling signal and the voltage command signal so as to output a voltage loop control signal at an output terminal O. The branch controller 51 receives the voltage loop control signal and converts it into a control signal to be sent to the second-stage converter 21. Specifically, the control signal is sent to a switching element in the second-stage converter 21. By switching on and off the switching element according to the control signal, the second-stage converter 21 may be enabled to enter the operating state or the non-operating state. In this way, the conversion branch L1 may be controlled to enter the operating state or the non-operating state, to implement the final output control.

By connecting output terminals of a plurality of conversion branches in series and connecting the first-stage isolated converters and the second-stage converters in the plurality of conversion branches in series so as to design the voltages at the output terminals of each conversion branch, and by controlling each conversion branch to enter the operating state or the non-operating state so as to combine the voltages at the output terminals of all the conversion branches in different ways, the power conversion device may output a voltage which is continuous and adjustable in a wide voltage range, and may optimize the design of each conversion branch.

It should be understood that the examples are only illustrative instead of limitation to the technical solution of the present disclosure; meanwhile, although the present disclosure is described in detail in combination with the examples in the specification, those of ordinary skill in the art should understand that they can modify or perform equivalent replacement on the present disclosure; therefore, all the technical solutions and improvements without departing from the spirit and scope of the present disclosure may be incorporated in the protection range of the appended claims of the present disclosure.

What is claimed is:

1. A power conversion device, comprising:
    a plurality of conversion branches, each comprising an input terminal, an output terminal, a first-stage isolated converter, and
    at least one second-stage converter among the plurality of conversion branches,
    wherein the second-stage converter is connected to an output terminal of the first-stage isolated converter in the same conversion branch,
    wherein the input terminals of the plurality of conversion branches are connected in parallel, and the output terminals of the plurality of conversion branches are connected in series,
    wherein an output voltage of the power conversion device is a sum of voltages at the output terminals of the plurality of conversion branches, and
    wherein the plurality of conversion branches are controlled to enter an operating state or a non-operating state make the output voltage of the power conversion device adjustable and continuous,
    wherein the power conversion device further comprising:
    a voltage sampling circuit, connected to the output terminal of the power conversion device for sampling the output voltage generated by the power conversion device and generating a voltage sample signal;
    a voltage control loop circuit, comprising a first input terminal, a second input terminal and an output terminal, wherein the first input terminal is connected to the voltage sampling circuit for receiving the voltage sampling signal, the second input terminal is used for receiving a voltage command signal, and the output terminal outputs voltage loop control signals; and
    a branch controller, connected to the output terminal of the voltage control loop circuit for receiving the voltage loop control signals, and outputting the control signals to the first-stage isolated converter of one of the conversion branches for controlling the first-stage isolated converter to enter the operating state or the non-operating state, and/or outputting the control signals to the second-stage converter for controlling the second-stage converter to enter the operating state or the non-operating state.

2. The power conversion device according to claim 1, wherein the voltages at the output terminals of the plurality of conversion branches are adjustable.

3. The power conversion device according to claim 1, wherein the voltages at the output terminals of the plurality of conversion branches are identical.

4. The power conversion device according to claim 1, wherein the voltages at the output terminals of the plurality of conversion branches are different.

5. The power conversion device according to claim 1, wherein the second-stage converter includes a non-isolated converter or an isolated converter.

6. The power conversion device according to claim 1 wherein the second-stage converter is a BUCK circuit.

7. The power conversion device according to claim 1, wherein the voltage at the output terminal of the first-stage converter is constant.

8. The power conversion device according to claim 1, wherein the bypass element is connected to the output terminal of the conversion branch in parallel.

9. The power conversion device according to claim 1, wherein the bypass element is a diode.

10. The power conversion device according to claim 1, wherein the first-stage isolated converters are of the same type.

11. The power conversion device according to claim 1, wherein the first-stage isolated converter is a LLC series resonant converter.

12. The power conversion device according to claim 1, wherein when the conversion branch enters the operating state, the output voltage at the output terminal of the conversion branch is continuous and adjustable in a preset voltage range according to the control signal.

13. The power conversion device according to claim 1, further comprising:
   a system controller, electrically connected to the second input terminals of the plurality of voltage control loop circuits, and outputting voltage command signals to the corresponding voltage control loop circuits respectively, each of the voltage control loop circuits receiving a corresponding voltage command signal.

14. A power conversion system, comprising a plurality of the power conversion devices according to claim 1,
   wherein the input terminals of the plurality of the power conversion devices are connected in parallel, and the output terminals of the plurality of the power conversion devices are connected in series, and
   wherein an output voltage of the power conversion system is a sum of the output voltages of the plurality of the power conversion devices.

15. The power conversion device according to claim 7, wherein the output voltage at the output terminal of the second-stage converter is adjustable.

16. The power conversion device according to claim 1, wherein the bypass element is contained within the first-stage isolated converter or the second-stage converter.

* * * * *